United States Patent
Gonzalez Perez (10) Patent No.: US 11,872,874 B1
(45) Date of Patent: Jan. 16, 2024

(54) TELESCOPICALLY EXTENDABLE TRUCK BED SHELL

(71) Applicant: Edgar Gonzalez Perez, South Daytona, FL (US)

(72) Inventor: Edgar Gonzalez Perez, South Daytona, FL (US)

(*) Notice: Subject to any disclaimer, the term of this patent is extended or adjusted under 35 U.S.C. 154(b) by 0 days.

(21) Appl. No.: 17/715,259

(22) Filed: Apr. 7, 2022

(51) Int. Cl.
*B60J 7/04* (2006.01)
*B60J 7/057* (2006.01)
*E05F 15/652* (2015.01)

(52) U.S. Cl.
CPC ............ *B60J 7/041* (2013.01); *B60J 7/0573* (2013.01); *E05F 15/652* (2015.01); *E05Y 2201/434* (2013.01); *E05Y 2201/684* (2013.01); *E05Y 2201/702* (2013.01); *E05Y 2400/66* (2013.01); *E05Y 2400/85* (2013.01); *E05Y 2900/516* (2013.01)

(58) Field of Classification Search
CPC ............ B60J 7/041; B60J 7/0573; B60J 7/64
USPC ........................................ 296/100.05, 100.03
See application file for complete search history.

(56) References Cited

U.S. PATENT DOCUMENTS

| | | | | |
|---|---|---|---|---|
| 3,578,378 A | * | 5/1971 | Anderson | B60J 7/041 296/100.04 |
| 4,659,136 A | * | 4/1987 | Martin | B60J 7/041 296/26.05 |
| 4,770,461 A | * | 9/1988 | Lovaas | B60J 7/041 296/100.04 |
| 4,784,429 A | * | 11/1988 | Hodges | B60J 7/041 296/26.05 |
| 4,789,197 A | * | 12/1988 | Lewis | B60J 7/041 296/100.04 |
| 4,813,735 A | * | 3/1989 | Avitable | B60J 7/041 296/180.1 |
| 4,974,898 A | * | 12/1990 | Baranski | B60J 7/047 220/345.5 |
| 5,067,766 A | | 11/1991 | Lovaas | |
| D327,463 S | * | 6/1992 | Williams | D12/403 |
| 5,156,195 A | * | 10/1992 | Wehler | B23Q 11/0875 160/202 |
| 5,203,603 A | * | 4/1993 | Hertzberg | B60J 7/041 296/100.03 |
| 5,368,396 A | * | 11/1994 | Cantrell | F16C 29/08 16/98 |
| 5,531,497 A | | 7/1996 | Cheng | |
| 6,017,082 A | * | 1/2000 | Leoni | B60J 7/02 296/182.1 |
| 8,540,302 B2 | * | 9/2013 | Lenz, Jr. | B60J 7/026 296/100.03 |

(Continued)

*Primary Examiner* — Jason S Morrow
(74) *Attorney, Agent, or Firm* — Sanchelima & Associates, P.A.; Christian Sanchelima; Jesus Sanchelima (57) ABSTRACT

A telescopically extendable truck bed shell including a shield assembly, a transmission assembly. The shield assembly includes shields telescopically connected together. The shields are configured to be mounted on top of a truck bed and attached at side rails. The transmission assembly includes a motor which drives motion to a threaded rod that is internally connected to the shields by means of bearing units and transmission gears. The motor is electrically powered and remotely controlled to permit a user to retract or extend the shields wirelessly. When contracted, the shields permit a user to easily retrieve items inside the truck bed.

15 Claims, 7 Drawing Sheets

(56) References Cited

U.S. PATENT DOCUMENTS

| | | | |
|---|---|---|---|
| 9,944,154 B2* | 4/2018 | Singer | B60J 7/041 |
| 2015/0130211 A1* | 5/2015 | Parshall | B60P 7/02 |
| | | | 296/100.04 |

* cited by examiner

TELESCOPICALLY EXTENDABLE TRUCK BED SHELL

BACKGROUND OF THE INVENTION

1. Field of the Invention

The present invention relates to a telescopically extendable truck bed shell and, more particularly, to a telescopically extendable truck bed shell that is remotely controlled.

2. Description of the Related Art

Several designs for truck bed shells have been designed in the past. None of them, however, include shields that are telescopically connected and that can be extended or contracted remotely using a remote controller.

Applicant believes that a related reference corresponds to U.S. Pat. No. 5,531,497 issued for an extendable cargo bed cap. Applicant believes that another related reference corresponds to U.S. Pat. No. 5,067,766 issued for a telescoping cover for a pickup truck bed. None of these references, however, teach of a truck bed cap comprising a plurality of cover sections telescopically connected together and slidably mounted to the truck bed side rails, wherein the panels are extended and retracted via an electrically powered and remotely controlled motor which drives a threaded rod.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a telescopically extendable truck bed shell that permits a user to easily retrieve items inside the truck bed It is another object of this invention to provide a device that can be actuated wirelessly by means of a remote controller.

It is still another object of the present invention to provide a telescopically extendable truck bed shell that can be easily mounted on existing truck beds.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 6 depicts an enlarged view of a bearing 46 receiving the housing 45 which has a slot 45a. The bearings 46 interact with said threaded rods 44 by means of a rack 46a.

DETAILED DESCRIPTION OF THE EMBODIMENTS OF THE INVENTION

Referring now to the drawings, where the present invention is generally referred to with numeral 10, it can be observed that it basically includes a shield assembly 20, a transmission assembly 40, and an actuation assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
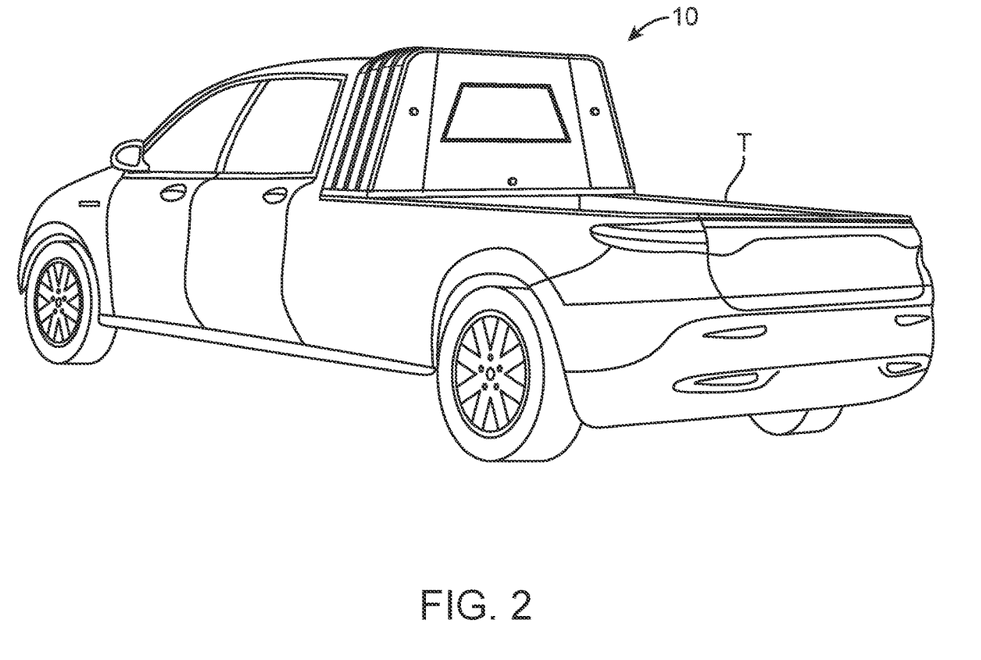
FIG. 2 shows an isometric view of the telescopically extendable truck bed shell 10 in retracted configuration mounted on a truck bed T.
Figure 3:
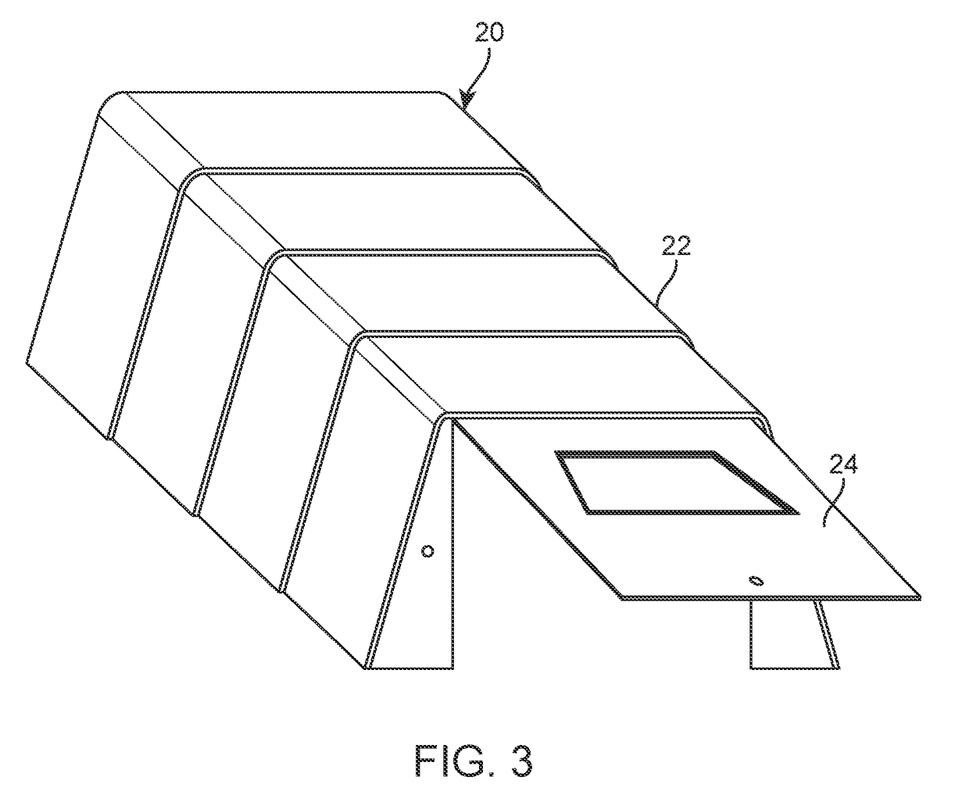
FIG. 3 illustrates an isometric view of the shield assembly including shields 22 and a door 24.

Better shown in FIG. 2 a truck may include truck bed T wherein the present invention 10 is to be mounted. The truck having a truck bed T may be a motor vehicle designed to transport cargo, specialized payloads, or the like. The truck bed T may be a rear part of a wagon, truck, trailer, or the like. Bed truck T may have a rectangular shape, quadrangular shape, or any suitable shape for truck beds as known in the art. In a suitable embodiment, the truck bed T may include side rails 12 that elevate a predetermined height.

Figure 1:
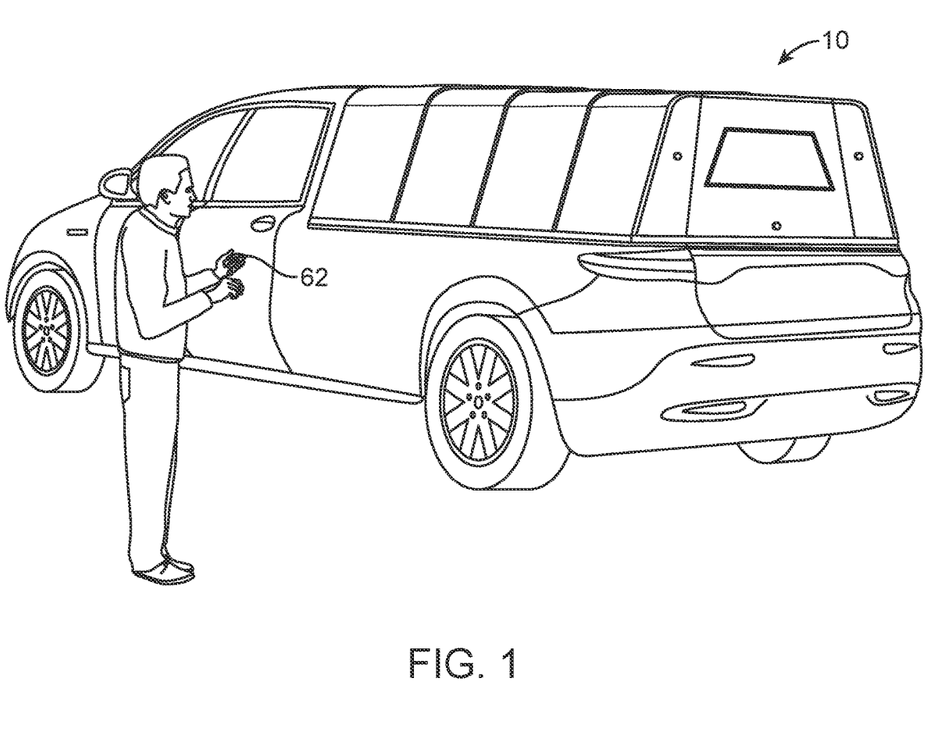
FIG. 1 represents an operational view of the telescopically extendable truck bed shell 10 in extended configuration mounted on a truck bed T. A user activates the present invention 10 using a remote controller 62.

The shield assembly 20 includes shields 22. Shields 22 may be mounted on said truck bed T as shown in FIG. 1. The shields 22 may be made of a sturdy, resistant, and durable material. Shields 22 may be made of carbon steel, alloy steel, stainless steel, tool steel, brass, bronze, iron, aluminum, nickel-based alloy, ceramics, polymers, fibers, metal alloy, composite materials, or any variation or combination thereof. As depicted in FIG. 1 each shield may include two lateral sides and a top side. In one embodiment, the shields 22 may have a trapezoidal shape wherein the lateral sides may be mounted on the side rails of the truck bed T. Nonetheless, in other embodiments, the shields 22 may have equal sides, curved sides, irregular sides, or any variation thereof. In a suitable embodiment the shields 22 may be telescopically connected to then be extended or contracted. In a suitable embodiment, said shields 22 may consist of 4 shields telescopically connected to each other. In another embodiment, the shields 22 may consist of 5 shields telescopically connected to each other. Nonetheless, the shields may include any required number of shields to cover a gamut of different sized truck beds T. The proximal shield, which may be the shield having the greater volume may be fixed to receive the other shields when in contracted configuration. The distal shield, which may be the shield having the smallest volume, may include a door 24 that may allow a user to have access to the interior of the shields 22. Better shown in FIG. 1 the shields may have an extended configuration. As shown in FIG. 2 shields 22 may have a contracted configuration. When in extended configuration, the door 24 may permit a user to access to the bed truck T interior. The door 24 may attaching elements that permit the door to be movable and/or to be fixed in a desired position.

Figure 4:
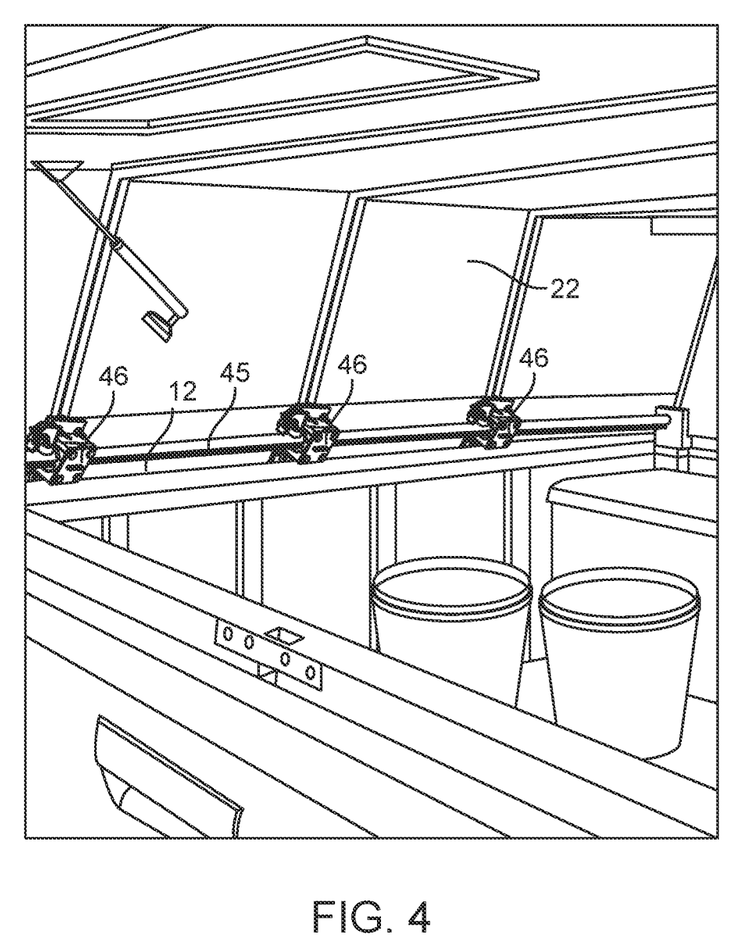
FIG. 4 is a representation of an isometric view of the threaded rod 44, the housing 45, and the bearing units 46 attached to an interior surface of the shields.
Figure 5:
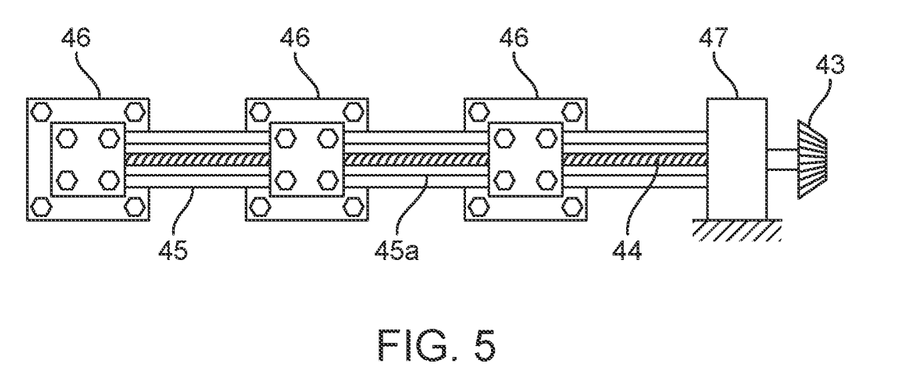
FIG. 5 shows a planar front view of the bearing units 46 receiving the housing 45 which partially encloses the threaded rod 44. At a distal end the housing 45 is held by a support member 47.
Figure 6:
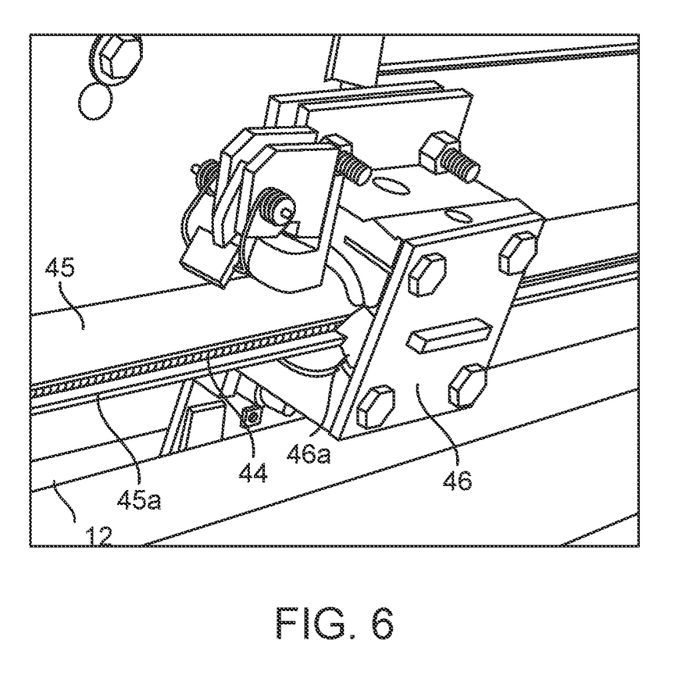
Figure 7:
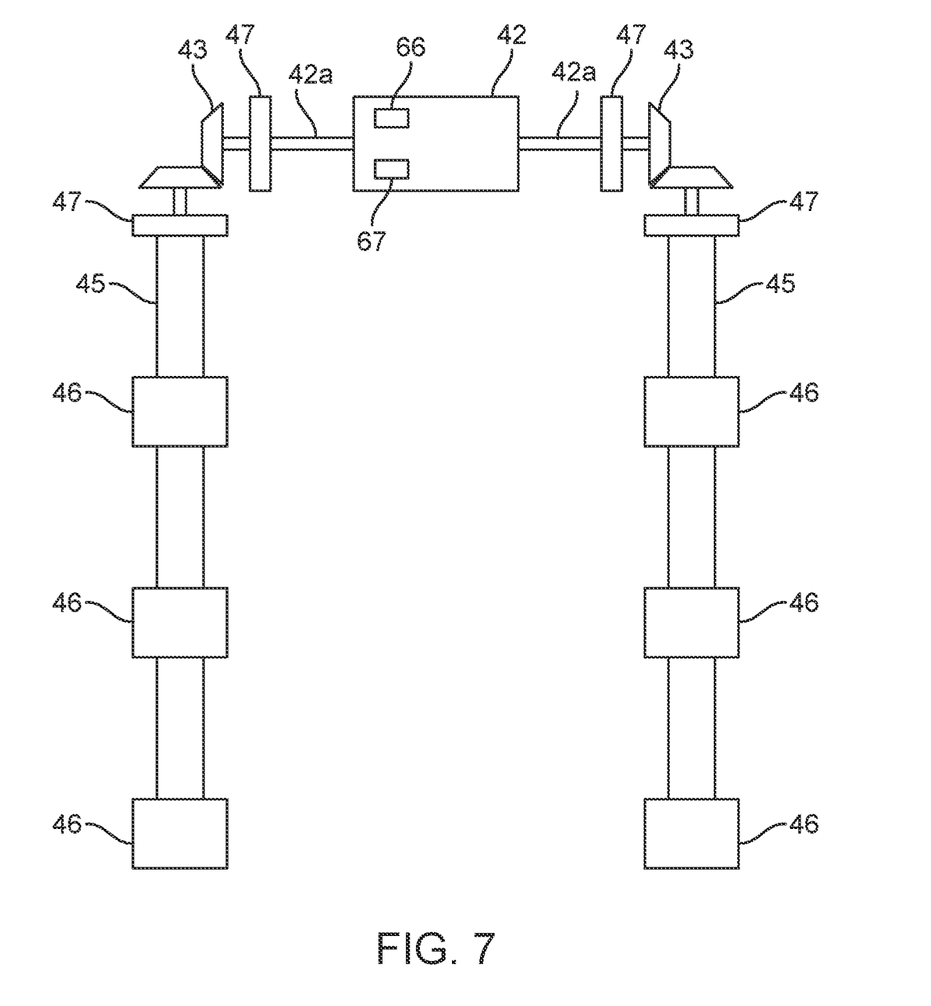
FIG. 7 depicts a schematic view of the receiver 66, the driver 67, the bearings 46, the support members 47, the shafts 42a, the transmission gears 43, and the motor 42 to transmit motion to the threaded rods by means of the transmission gears 43.

The transmission assembly 40 includes a motor 42, transmission gears 43, threaded rods 44, housings 45, and bearings 46. The motor 42 may be an electrical machine that converts electrical energy into mechanical energy that may be transmitted to different elements. In one embodiment, the motor 22 may be powered by a DC source. In another embodiment, the motor 42 may be powered by an AC source. In a suitable embodiment, the motor 42 may be powered by the battery (not shown in the figures) of the truck that receives the shield assembly 20. Nonetheless, in another embodiment, to motor 42 may be powered by an external source. The motor 42 may be located inside the truck bed T. In a preferred embodiment, the motor 42 may be located proximal to the shield that has the greater volume, proximal to the cabin of the truck. The motor 42 may transmit motion by means of shafts 42a that may be held by support members 47. The support members 47 may provide additional structural support. The bearings 46 may be attached to an interior surface of the shields 22 as depicted in FIG. 4. In a preferred embodiment the bearings 46 may be attached on the interior surface of the shields proximal to the bed truck T. Bearings 46 may be attached thereon using fasteners such as screws, washers, nuts, bolts, rivets, anchors, or the like. In a suitable embodiment, the bearings 46 may be linear bearings, wherein the linear bearings support the load of the carriage during its single axis linear movement and may provide a low friction sliding surface. In a suitable embodiment, the bearings 46 may be attached to the interior of the non-fixed shields, this is, the shields that are movable to be in contracted or extended configuration. The bearings 46 may receive the threaded rods 44 that are enclosed by the housings 45 as depicted in FIG. 6. Each of the housings 45 may be an elongated member that may be hollow. In one embodiment, each housing may have an elongated cylindrical member, nonetheless, in other embodiments each housing 45 may have any other suitable shape that me be received by the bearings 46. Each of the housings 45 may be made of a durable, sturdy, and resistant material. The housings 45 may be made of carbon steel, alloy steel, stainless steel, tool steel, brass, bronze, iron, aluminum, nickel-based alloy, ceramics, polymers, fibers, metal alloy, composite materials, or any variation or combination thereof. The housings 45 may have a suitable length that may match the length of the truck bed T. Each of the housings 45 may include a slot 45a that longitudinally extends along each housing 45. Each housing 45 may be volumetrically suitable to enclose each threaded rod from the threaded rods 44. Each threaded rod may be a threaded rod having a predetermined length and diameter. Each threaded rod may receive motion from the motor 42 by means of transmission gears 43. The bearings 46 may be in direct contact with each threaded rod 44 through the slot 45a of each housing 45. In another embodiment, each bearing may have an internal rack 46a that interacts with the thread of the threaded rod 44 to move the bearings 46 and, thus, the shields 22. The concatenation of the bearings 46, the housing 45 with the slot 45a, the threaded rod 44, the support member 47 and one transmission gear 43 is better depicted in FIG. 5. The motion generated by the moot 42 may be transmitted to the threaded rods by means of the shafts 42a and the transmission gears 43. As depicted in FIG. 7, the transmission gears may be any suitable type of gear that permits to transmit motion to a different axis. In one embodiment, the shafts 42a may be orthogonal to the threaded rods 44, then, the transmission gears 43 may be in right angle configuration to transmit the motion from a source axis to a perpendicular axis. The threaded rods 44 may be connected to the transmission gears 43 to receive motion coining from the motor 42. When the threaded rods 44 may rotate to a predetermined direction, the shields 42 may expand or retract to have the aforementioned extended or contracted configuration.

Figure 8:
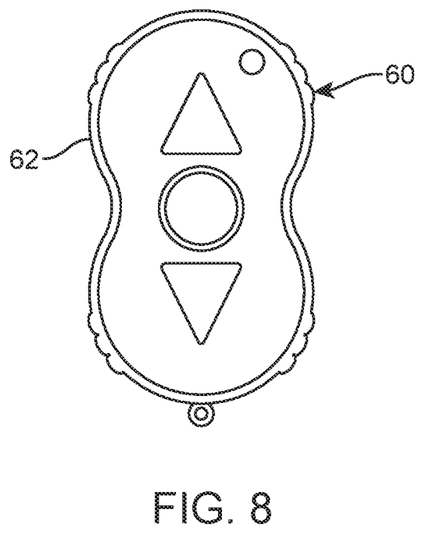
FIG. 8 Is a front planar view of the remote controller 62.
Figure 9:
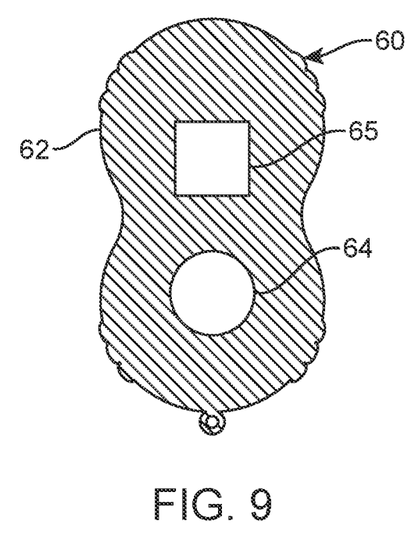
FIG. 9 represents a cross sectional view of the remote controller 62 having the transmitter 65 and the battery 64 enclosed therein.

The actuation assembly 60 includes a remote controller 62, a receiver 66, and a driver 67. The remote controller 62 may include buttons 63, a battery 64, and a transmitter 65. The remote controller 62 may permit a user to remotely activate the motor to extend or contract the shields. The remote controller 62 may be volumetrically suitable to be handheld. The buttons 63 may be used to defined predetermined actions. In one of the embodiments, one of the buttons 63 may be used to extend the shields. In another embodiment, another button from the buttons 63 may be used to contract the shields. Transmitter 65 may send a signal having format of an electromagnetic radiation. Transmitter 65 may use wireless technology such as ultrasonic technology, infrared technology, RF technology, Wi-Fi™ technology, Bluetooth™ technology, or any variation thereof. The buttons 63 may be configured to perform predetermined actions that are transmitted by the transmitter 65. The battery 65 may be electrically connected to the transmitter to supply electrical energy. In a suitable embodiment, the battery may be removably inserted to the remote controller. The receiver 66 may be electronic component that receives the signal having an electromagnetic radiation format that may be sent by the transmitter 65, wherein the signal may include predetermined instructions. The receiver 66 may use wireless technology such as ultrasonic technology, infrared technology, RF technology, Wi-Fi™ technology, Bluetooth™ technology, or any variation thereof. The receiver 66 may be electrically connected to the driver 67. The driver 67 may be an electronic component that may be used to vary the direction in which the motor 42 generates motion. The driver 67 may be the element that indicates the motor 42 to rotate to a predetermined direction to extend the shields 22 or to contract the shields 22 depending on what button a user may press. The driver 47 may be electrically connected to the motor 42.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A telescopically extendable truck bed shell, comprising:
a truck including a truck bed;
a shield assembly including shields telescopically connected together which are slidably mounted to said truck bed at side rails by means of bearings; and
a transmission assembly including a motor and said bearings, wherein said motor is electrically powered and remotely controlled, the motor transmits motion to threaded rods wherein said threaded rods are mounted on said truck bed above said side rails wherein a bottom portion of said bearings is slidable mounted to said side rails, wherein a central portion of said bearings are slidable attached to said threaded rods, wherein a top portion of each of said bearings is fixed to a corresponding shield of said shields wherein said motor is actuated to force the threaded rod to slide the bearings along its length to retract or extend the shields.

2. The telescopically extendable truck bed shell of claim 1, wherein said shields have a proximal shield and a distal shield, the proximal shield is fixed and receive the shields therein, the distal shield includes a door.

3. The telescopically extendable truck bed shell of claim 1, wherein said shields have an extended configuration and a contracted configuration.

4. The telescopically extendable truck bed shell of claim 1, wherein each shield from the shields has two lateral sides and a top side, wherein a bottom portion of the each of said two lateral sides is fixed to said top portion of said bearings.

5. The telescopically extendable truck bed shell of claim 1, wherein the transmission assembly further includes housings, transmission gears, and shafts.

6. The telescopically extendable truck bed shell of claim 5, wherein said housings partially enclose the threaded rods.

7. The telescopically extendable truck bed shell of claim 5, wherein each housing from the housings has a slot that longitudinally extends along each housing.

8. The telescopically extendable truck bed shell of claim 7, wherein the bearings are linear bearings that permit to transmit motion along a straight axis, when rotating, the threaded rods interact with said bearings through said slot and as the bearings are attached to the shields the rotation of the threaded rods causes the bearings to move along said threaded rod.

9. The telescopically extendable truck bed shell of claim 5, wherein said motor transmits motion to said threaded rods by means of said shafts and said transmission gears.

10. The telescopically extendable truck bed shell of claim 5, wherein said transmission assembly further includes supporting members that support the shafts and the transmission gears.

11. The telescopically extendable truck bed shell of claim 1 further including an actuation assembly including a remote controller, a receiver, and a driver.

12. The telescopically extendable truck bed shell of claim 11, wherein said remote controller sends wireless instructions to remotely activate the motor to extend or contract said shields.

13. The telescopically extendable truck bed shell of claim 12, wherein said receiver is electrically connected to the driver, the receiver receives a wireless instructions sent by the remote controller, the receiver is electrically connected to the driver which receives the instructions from the receiver, the driver is electrically connected to the motor to change a direction in which the motion is delivered by the motor, said direction is dictated by the remote controller.

14. A telescopically extendable truck bed shell, comprising:
   a truck including a truck bed, said truck bed having side rails;
   a shield assembly including shields telescopically connected which are slidably mounted to said truck bed at side rails by means of bearings, said shields having a proximal shield which is fixed with respect to the rest of the shields, said shields having a distal shield which includes a door, the shields have an extended configuration and a contracted configuration, each of the shields have two lateral sides and a top side;
   a transmission assembly including a motor, threaded rods, said bearings, and housings, wherein said motor is electrically powered and remotely controlled, the housings are elongated members that enclose the threaded rods, each of the housings has a slot that leaves the threaded rod exposed, the bearings interact with the threaded rods through said slot of each housing, the bearings are linear bearings that slide along said housing when said threaded rod rotates, the motor transmits motion to the threaded rods by means of shafts and transmission gears, wherein said threaded rods are mounted on said truck bed above said side rails, wherein a bottom portion of said bearings is slidable mounted to said side rails, wherein a central portion of said bearings are slidable attached to said threaded rods wherein a top portion of each of said bearings is fixed to a corresponding shield of said shields, wherein said motor is actuated to force the threaded rod to slide the bearings along its length to retract or extend the shields; and
   an actuation assembly including a remote controller a receiver and a driver, the remote controller includes buttons, a transmitter and a battery, each of the buttons have a predetermined function that is wirelessly transmitted by said transmitter, the battery provides electrical energy to said transmitter, the remote controller is configured to permit a user to remotely extend or contract said shields, the receiver may receive a signal that comes from the transmitter, wherein said signal carries predetermined instructions, the receiver is electrically connected to the driver, the driver is electrically connected to the motor, the driver changes a direction in which the motion is delivered by the motor, said direction is dictated by the remote controller.

15. A telescopically extendable truck bed shell, consisting of:
   a truck including a truck bed, said truck bed having side rails;
   a shield assembly including shields telescopically connected which are slidably mounted to said truck bed by means of bearings, said shields having a proximal shield which is fixed with respect to the rest of the shields, said shields having a distal shield which includes a door, the shields have an extended configuration and a contracted configuration, each of the shields have two lateral sides and a top side;
   a transmission assembly including a motor, threaded rods, said bearings, and housings, wherein said motor is electrically powered and remotely controlled, the housings are elongated members that enclose the threaded rods, each of the housings has a slot that leaves a portion of the threaded rod exposed, the bearings receive the housings and interact with the threaded rods through said slot of each housing by means of racks, the bearings are linear bearings that moves along said housing when said threaded rod rotates, the motor transmits motion to the threaded rods by means of shafts and transmission gears, wherein said threaded rods are mounted on said truck bed above said side rails, wherein a bottom portion of said bearings is slidable mounted to said side rails, wherein a central portion of said bearings are slidable attached to said threaded rods, wherein a top portion of each of said bearings is fixed to a corresponding shield of said shields, wherein said motor is actuated to force the threaded rod to slide the bearings along its length to retract or extend the shields; and an actuation assembly including a remote controller a receiver and a driver, the remote controller includes buttons, a transmitter and a battery, each of the buttons have a predetermined function that is wirelessly transmitted by said transmitter, the battery provides electrical energy to said transmitter, the remote controller is configured to permit a user to remotely extend or contract said shields, the receiver may receive a signal that comes from the transmitter, wherein said signal carries predetermined instructions, the receiver is electrically connected to the driver, the driver is electrically connected to the motor, the driver changes a direction in which the motion is delivered by the motor, said direction is dictated by the remote controller.

* * * * *